No. 783,235. PATENTED FEB. 21, 1905.
M. M. ARGERSINGER.
SKIMMER.
APPLICATION FILED NOV. 16, 1904.
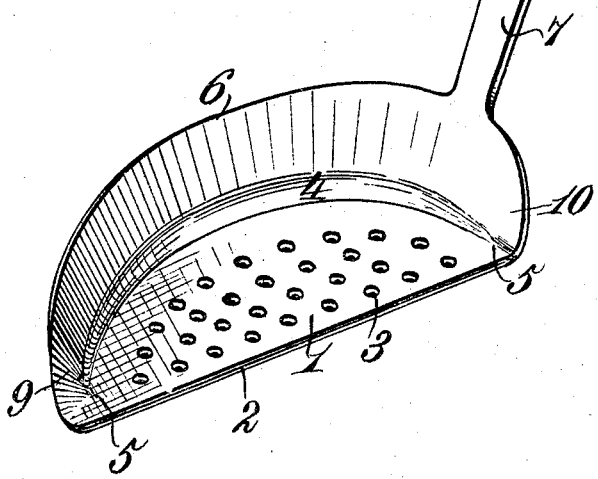
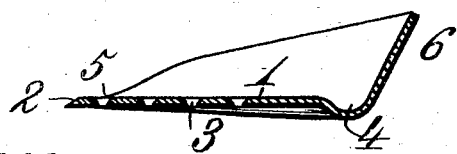
Witnesses.
Robert Everett
N. L. Bogan
Inventor.
Marguerite M. Argersinger.
By James L. Norris
Atty.

No. 783,235.

Patented February 21, 1905.

UNITED STATES PATENT OFFICE.

MARGUERITE MAE ARGERSINGER, OF CLEVELAND, OHIO, ASSIGNOR OF ONE-HALF TO GEORGE H. WORTHINGTON, OF CLEVELAND, OHIO.

SKIMMER.

SPECIFICATION forming part of Letters Patent No. 783,235, dated February 21, 1905.

Application filed November 16, 1904. Serial No. 233,000.

*To all whom it may concern:*

Be it known that I, MARGUERITE MAE ARGERSINGER, a citizen of the United States, residing at Cleveland, in the county of Cuyahoga and State of Ohio, have invented new and useful Improvements in Skimmers, of which the following is a specification.

This invention relates to a skimmer; and the object thereof is to provide a new construction of skimmer hereinafter more specifically described, and particularly adapted for skimming jellies and also for other purposes for which it is applicable.

The invention further aims to so construct the skimming portion of the utensil as to prevent during the act of skimming the jelly the passage of the froth to the body of the jelly, but at the same time permit the passage of the syrup which has been gathered up when skimming off the froth.

The invention further aims to so construct the skimmer with what may be termed a "gutter" for receiving the substance skimmed off, so that when removing the skimmer from the pot or kettle said substance will be prevented from returning through the skimmer into the pot or kettle except through accident or carelessness.

The invention further aims to position the handle of the skimmer at such an angle with respect to the skimming portion and attach the handle to the skimming portion at such a point so as to facilitate the act of skimming without inconvenience to the person using the utensil and at the same time causing the body portion of the skimmer to lie flat and not at an inclination when skimming.

The invention further aims to construct a skimmer which shall be simple in its construction, strong, durable, efficent in its use, and comparatively inexpensive to manufacture.

With the foregoing and other objects in view the invention consists of the novel construction, combination, and arrangements of parts hereinafter more specifically described, illustrated in the accompanying drawings, which form a part of this specification, and wherein is shown the preferred embodiment of a skimmer constructed in accordance with this invention; but it is to be understood that variations, changes, and modifications can be resorted to which come fully within the scope of the claims hereunto appended.

In the drawings, wherein like reference characters denote corresponding parts throughout the several views, Figure 1 is a perspective view of the skimmer, and Fig. 2 is a section from front to rear through the center of the skimmer.

Referring to the drawings by reference characters, 1 denotes a flat skimming portion which is segment-shaped in contour and has a beveled edge 2 and a series of funnel-shaped openings 3. The openings 3 preferably are arranged in a segment-shaped group, and the outer openings of the group are positioned in the skimming portion 1 at a point removed from the rear of said portion 1 and at a point removed from the beveled edge 2. By such an arrangement a wide imperforate part of the skimming portion 1 entirely surrounds the group of openings 3. The openings 3 are constructed funnel-shaped, as it has been found that such shape acts to prevent the passage of froth through the openings when skimming; but the shape of the openings does not prevent the passage of the syrup gathered during the skimming. The back of the skimming portion 1 merges in an imperforate gutter 4 of less length than said back and the function of which is to receive the substances skimmed off, so that during the removal of the skimmer from the pot or kettle said substance will be prevented from leaving the skimmer and passing back into the pot or kettle. The gutter 4 and skimming portion 1 also merge into an inclined imperforate back wall 6, which gradually increases in height from one end to the handle 7. One end of the inclined back wall 6 merges into the skimming portion 1 in advance of one end of the gutter 4, as at 9, while the other end of the back wall 6 merges in the skimming portion 1 in advance of the other end of the gutter 4 and projects away from the front of the skimming portion 1 at an inclination, as at 10. The handle 7 extends upwardly and away from the wall 6 at an angle with respect thereto and is provided with a slot 11 to permit of hanging up the skimmer when not in use. The handle 7 is secured to the back wall 6 at a point between the center of said wall 6 and the end 10 and extends at an angle with respect to the edge 2 of the skimming portion 1, or, in other words, if a line was drawn through the center of the handle in a longitudinal direction it would pass diagonally through the skimming portion 1. This arrangement of the handle with respect to the skimming portion and also with respect to the back wall 6 causes the skimming portion 1 to lie flat during the act of skimming and also the extending of the handle upwardly will prevent the operator's hand from coming in contact with the steam from the substance being cooked, as when using the skimmer the operator is not compelled to grasp the handle in close proximity to the substance, as would be the case if the handle extended from the back wall 6 in a longitudinal direction with respect to the edge 2 of the body portion.

By merging the back wall 6 in the skimming portion 1 at the point indicated by the reference character 9 it facilitates the skimming from the side of the pot or kettle and forms what may be termed a "catch" portion for the skimmed-off substance, as said substance will fall upon that part of the skimmer indicated by the reference character 9 and then will be caused to pass over upon the skimming portion 1.

Having thus fully described my invention, what I claim as new, and desire to secure by Letters Patent, is—

1. A device of the character described, comprising a flat perforated skimming portion having a straight edge, an inclined back wall, a gutter interposed between said skimming portion and said wall, and an upwardly-extending handle secured to the back wall.

2. A device of the character described, comprising a skimming portion having a beveled edge and further provided with funnel-shaped openings, an inclined back wall merging at one end into said skimming portion and forming a catch portion, an upwardly-extending handle secured to said side wall at a point between the center and one end thereof, and a gutter interposed between said skimming portion and said back wall.

3. A device of the character described, involving an imperforate gutter, a perforated skimming portion merging into said gutter, an imperforate back wall merging into said skimming portion in advance of the ends of the gutter and further merging into said gutter, and an upwardly-extending inclined handle secured to said back wall between the center and one end thereof.

In testimony whereof I have hereunto set my hand in presence of two subscribing witnesses.

MARGUERITE MAE ARGERSINGER.

Witnesses:
N. L. BOGAN,
GEO. W. REA.